(12) United States Patent
Price et al.

(10) Patent No.: US 11,922,481 B2
(45) Date of Patent: Mar. 5, 2024

(54) ITEM RECOMMENDATIONS WEIGHTED BY USER-VALUED FEATURES

(71) Applicant: Capital One Services, LLC, McLean, VA (US)

(72) Inventors: Micah Price, Plano, TX (US); Qiaochu Tang, Frisco, TX (US); Jason Hoover, Grapevine, TX (US); Avid Ghamsari, Plano, TX (US); Geoffrey Dagley, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 154 days.

(21) Appl. No.: 17/643,846

(22) Filed: Dec. 13, 2021

(65) Prior Publication Data

US 2022/0101409 A1   Mar. 31, 2022

Related U.S. Application Data

(63) Continuation of application No. 16/909,508, filed on Jun. 23, 2020, now Pat. No. 11,232,507, which is a continuation of application No. 16/352,315, filed on Mar. 13, 2019, now Pat. No. 10,733,656.

(51) Int. Cl.
*G06Q 30/00* (2023.01)
*G06Q 30/0601* (2023.01)

(52) U.S. Cl.
CPC ..... *G06Q 30/0631* (2013.01); *G06Q 30/0627* (2013.01); *G06Q 30/0629* (2013.01)

(58) Field of Classification Search
None
See application file for complete search history.

(56) References Cited

U.S. PATENT DOCUMENTS

| | | | |
|---|---|---|---|
| 9,466,079 B2 | 10/2016 | Hygema et al. | |
| 10,127,596 B1 | 11/2018 | Franke et al. | |
| 11,037,071 B1* | 6/2021 | Tekiela | G06N 20/00 |
| 2008/0243631 A1* | 10/2008 | Kane | G06Q 30/0253 |
| | | | 705/14.5 |
| 2009/0327163 A1 | 12/2009 | Swan et al. | |
| 2011/0107260 A1 | 5/2011 | Park et al. | |
| 2013/0103634 A1* | 4/2013 | Jojic | G06Q 30/02 |
| | | | 706/52 |
| 2014/0129386 A1 | 5/2014 | Ghouri et al. | |
| 2015/0363865 A1 | 12/2015 | Ramanuja et al. | |
| 2017/0069016 A1 | 3/2017 | Rackley et al. | |
| 2017/0316483 A1* | 11/2017 | Lester | G06Q 30/0641 |

* cited by examiner

*Primary Examiner* — Mila Airapetian
(74) *Attorney, Agent, or Firm* — Bookoff McAndrews, PLLC (57) ABSTRACT

Computer-implemented methods, computer systems, and computer readable media for determining, sorting, or determining and sorting a set of items. The method includes receiving, via a user device, parameter values from a user and receiving parameter weights. The method further includes determining a sort score for each vehicle of a set of vehicles based on the received parameter values and parameter weights, and sorting the set of vehicles based on the sort score of each vehicle of the set of vehicles.

20 Claims, 8 Drawing Sheets

FIG. 1

| | FIAT JEEP CHEROKEE | CHEVROLET MALIBU | FORD FOCUS | NISSAN LEAF | HYUNDAI SONATA | TOYOTA COROLLA | BMW 328i | SUBARU OUTBACK | VOLKSWAGEN JETTA | JAGUAR F-TYPE |
|---|---|---|---|---|---|---|---|---|---|---|
| FIAT JEEP CHEROKEE | 1.0 | 0.3 | 0.2 | 0.1 | 0.2 | 0.3 | 0.4 | 0.6 | 0.7 | 0.4 |
| CHEVROLET MALIBU | 0.3 | 1.0 | 0.7 | 0.6 | 0.8 | 0.8 | 0.3 | 0.5 | 0.4 | 0.3 |
| FORD FOCUS | 0.2 | 0.7 | 1.0 | 0.8 | 0.8 | 0.9 | 0.3 | 0.6 | 0.4 | 0.3 |
| NISSAN LEAF | 0.1 | 0.6 | 0.8 | 1.0 | 0.4 | 0.7 | 0.2 | 0.3 | 0.3 | 0.2 |
| HYUNDAI SONATA | 0.2 | 0.8 | 0.8 | 0.4 | 1.0 | 0.9 | 0.2 | 0.4 | 0.3 | 0.2 |
| TOYOTA COROLLA | 0.3 | 0.8 | 0.9 | 0.7 | 0.9 | 1.0 | 0.2 | 0.4 | 0.3 | 0.2 |
| BMW 328i | 0.4 | 0.3 | 0.3 | 0.2 | 0.2 | 0.2 | 1.0 | 0.3 | 0.4 | 0.9 |
| SUBARU OUTBACK | 0.6 | 0.5 | 0.6 | 0.3 | 0.4 | 0.4 | 0.3 | 1.0 | 0.8 | 0.3 |
| VOLKSWAGEN JETTA | 0.7 | 0.4 | 0.4 | 0.3 | 0.3 | 0.3 | 0.4 | 0.8 | 1.0 | 0.4 |
| JAGUAR F-TYPE | 0.4 | 0.3 | 0.3 | 0.2 | 0.2 | 0.2 | 0.9 | 0.3 | 0.4 | 1.0 |

*FIG. 2*

| PARAMETER | VALUE | IMPORTANCE |
|---|---|---|
| MAKE | | —————○——— |
| MODEL | | —————○——— |
| BODY STYLE | | —————○——— |
| COLOR | | —————○——— |
| MILEAGE | | —————○——— |

FIG. 3A

| PARAMETER | VALUE | IMPORTANCE |
|---|---|---|
| MAKE | TOYOTA | ————————○— |
| MODEL | COROLLA | ————————○— |
| BODY STYLE | COUPE | —————————○ |
| COLOR | NO PREFERENCE | ———○——————— |
| MILEAGE | LESS THAN 80,000 MILES | ○————————— |

| FEATURES | RANK |
|---|---|
| NEW, USED, HEATED SEATS, BLUETOOTH, 4WD, AWD, MODEL YEAR ˅, COLOR ˅, SUN ROOF, BACKUP CAMERA, CRUISE CONTROL, AUTOMATIC TRANSMISSION, MANUAL TRANSMISSION, MODEL ˅, BODY TYPE ˅, FUEL ECONOMY ˅, HYBRID, MILEAGE ˅ | 1<br>2<br>3<br>4 |

FIG. 4B

| FEATURES | RANK |
|---|---|
| ≥30 MPG ˅ | 1 |
| 4WD | 2 |
| HEATED SEATS | |
| ≤ 80,000 MILES ˅ | 3 |
| BLUE ˅ | 4 |
| NEW, USED, BLUETOOTH, SUN ROOF, AWD, MODEL YEAR ˅, BACKUP CAMERA, CRUISE CONTROL, AUTOMATIC TRANSMISSION, MODEL ˅, BODY TYPE ˅, MANUAL TRANSMISSION, HYBRID | |

NECESSARY PARAMETERS:

COLOR: BLUE

EXTRAS: BLUETOOTH; [+]

(+)

| MAKE: | TOYOTA ▽ | SIMILARITY: |
| MODEL: | COROLLA ▽ | ———○— |

| PARAMETER | VALUE | IMPORTANCE |
| --- | --- | --- |
| FUEL ECONOMY | 0 — 50, 20 MPG | ————○— |
| MILEAGE | 0 — 200K, 80K | —○———— |
| MODEL YEAR | 1988 — 2018, 2010 | ○————— |
| BODY TYPE | COMPACT / MIDSIZE / COUPE / CROSSOVER ▽ | —————○ |
| TRANSMISSION | AUTOMATIC / MANUAL | ———○—— |
| HEATED SEATS | ● YES  ○ NO | —○———— |

ITEM RECOMMENDATIONS WEIGHTED BY USER-VALUED FEATURES

CROSS-REFERENCE TO RELATED APPLICATION(S)

This patent application is a continuation of and claims the benefit of priority to U.S. Nonprovisional patent application Ser. No. 16/909,508, filed on Jun. 23, 2020, which is a continuation of U.S. Nonprovisional patent application Ser. No. 16/352,315, filed on Mar. 13, 2019, the disclosures of each of which are incorporated herein by reference in their entirety.

TECHNICAL FIELD

Various embodiments of the present disclosure relate generally to generating customizable comparisons of parametric data. More specifically, embodiments of the present disclosure relate to determining a set of items based on a plurality of parameters.

BACKGROUND

Users of relatively expensive goods, such as cars, home theaters, mattresses, boats, computers, etc. may conduct part or all of their shopping for such items online, via the internet. In researching and completing such a purchase, a user may have several criteria for that purchase. For example, consumers may have desired criteria regarding the aspects of the good, the availability of the good, or a monetary value of the good. However, the manner in which these criteria are expressed, grouped, or clustered may be inefficient and/or difficult to organize in a meaningful manner. Thus, a user may be unable to sufficiently research their options in selecting such goods. Furthermore, in areas of commerce such as those described above, the amount of information available may be so large as to be prohibitive for an individual consumer to obtain, analyze, and/or synthesize the information. Thus, consumers may make sub-optimal purchase decisions due to a lack of accessible and/or digestible information.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, non-transitory computer readable media, systems, and methods are disclosed for determining one or more sets of information. Each of the examples disclosed herein may include one or more of the features described in connection with any of the other disclosed examples.

In one example, a computer-implemented method may be used for determining purchase recommendations. The method may include receiving, via a user device, parameter values from a user. The method may include receiving parameter weights. The method may further include determining a sort score for each vehicle of a set of vehicles based on the received parameter values and parameter weights. The method also may include sorting the set of vehicles based on the sort score of each vehicle of the set of vehicles. The method may further include applying a hard filter to a domain of vehicles to determine the set of vehicles. As related to the method, receiving parameters weights may include receiving the parameter weights from the user via the user device. The method may further include determining a subset of vehicles form the set of vehicles based on the sort score of each vehicle. The method may further include outputting the sorted set of vehicles to the user device. The method may include wherein the determining the sort score for each vehicle of the set of vehicles includes generating one or more parameter similarity values for each vehicle of the set of vehicles. As related to the method, each parameter similarity value may be greater than or equal to zero and less than or equal to one. The one or more parameter similarity values may be based on a similarity matrix. The method may include wherein the sort score for each vehicle of the set of vehicles is determined according to at least one of Equation 1, Equation 2, or Equation 3, wherein the sort score is calculated based on parameter similarity values and parameter weights for a given number of parameters.

According to another aspect of the disclosure, a computer system may comprise memory storing instructions, one or more processors configured to execute the instructions, wherein executing the instructions includes performing operations. The operations may include receiving a vehicle model preference. Other operations may include determining a set of vehicles from a domain of vehicles based on the vehicle model preference. Other operations may include receiving one or more parameter values from a user via a user device. Other operations may include receiving or more parameter weights. Other operations may include determining a sort score for each vehicle in the set of vehicles based on the one or more parameter values and the one or more parameter weights.

The computer system may further include instructions for performing an operations including sorting the set of vehicles based on the sort score of each vehicle. The operations may further include, determining a subset of vehicles from the set of vehicles based on the sort score of each vehicle, sorting the vehicles of the subset of vehicles based on the sort score of each vehicle, and outputting the sorted set of vehicles to the user device. Other operations may include determining one or more parameter similarity values for each vehicle of the set of vehicles, based on the one or more received parameter values. In the aforementioned operations, the sort score for each vehicle of the set of vehicles may be determined based on the received parameter weights and the determined parameter similarity values. The one or more parameter similarity values for each vehicle of the set of vehicles may be determined based on a similarity matrix. Further, each parameter similarity value for each vehicle of the set of vehicles may be greater than or equal to zero and less than or equal to one. The one or more parameter weights are received from a user via the user device. The one or more parameter values may be indicative of a mileage, a fuel economy, a price, one or more luxury features, a drivetrain, and/or a color of the vehicle. The sort score for each vehicle of the set of vehicles may be determined according to at least one of Equation 1, Equation 2, or Equation 3, wherein the sort score is calculated based on parameter similarity values and parameter weights for a given number of parameters.

According to some exemplary aspects of the present disclosure, a non-transitory computer-readable media storing instructions that, when executed by one or more processors of a computer system, may cause the one or more processors to perform a plurality of operations. In some exemplary aspects of the present disclosure, the plurality of operations may include receiving parameter values from a user via a user device. In some aspects, the operations may include receiving parameter weights from the user via the user device. The operations may further include applying a hard filter to a domain of vehicles to determine a set of vehicles. In further aspects, the operations may include determining one or more parameter similarity values for each vehicle of the set of vehicles, based on the received parameter values. In some aspects, operations may include determining a sort score for each vehicle of the set of vehicles based on the determined parameter similarity values and the received parameter weights. Operations may further include sorting the set of vehicles based on the sort score of each vehicle of the set of vehicles. In further aspects, the operations may include outputting the sorted set of vehicles to the user device.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value. Additionally, in this disclosure, the term "computer system" generally encompasses any device or combination of devices, each device having at least one processor that executes instructions from a memory medium. Additionally, a computer system may be included as a part of another computer system.

In general, the present disclosure provides methods and systems for determining and/or sorting a set of items based on received data. For example, a set of purchase recommendations may be generated based on received data indicative of a user's preferences. While automotive vehicles are referenced herein as an exemplary application for the systems and methods described herein, it will be understood that this disclosure is not limited to automotive vehicles and may apply to other contexts, such as real estate, technology, boats, mattresses, electronics, and/or other items. The systems and methods described herein may be used in order to present information to users. For example, the disclosed systems and methods may be used to present information regarding one or more vehicles to a user. In some embodiments, the disclosed systems and methods may be used in order to present information to a dealer or other distributor of goods to users. The disclosed systems and methods also may learn a user's preferences over time and may deliver recommendations to the user in accordance with those preferences. The systems and methods disclosed herein may base these recommendations at least in part based on information gathered regarding the vehicle-purchasing preferences of a population. While the disclosure includes descriptions of exemplary methods, it will be understood that the steps of each method may be combined in various combinations or permutation and/or may be mixed and matched. For example, a step from one exemplary method may be used in conjunction with steps of another exemplary method.

User preference data may include one or more parameters relating to a user's preferences regarding a certain good. For example, user preference data may include information relating to features of a vehicle, availability of a vehicle, or the value of a vehicle. User preference data may be input by a user, input by a dealer or other third-party, collected from a user's activities or behavior (e.g., collected based on a user's internet search history), or estimated from a computer-learning model (e.g., machine learning model) or other statistical model. User preference data may include a plurality of parameter values, such as, for example, make of vehicle, model of vehicle, vehicle color, vehicle mileage, vehicle fuel economy, one or more parameters relating to the location of the vehicle (e.g., zip code, state, region), dealer in possession of the vehicle, value of vehicle, condition of vehicle, and/or luxury features of the vehicle (e.g., side air bags, sun roof, four-wheel drive, etc.). User preference data may include parameter values that are one-ended ranges, open-ended ranges, approximations, exact matches, or other quantification of a user's preference. For example, user preference data might include parameter values that convey a user prefers vehicles similar to a Toyota Corolla, with about 80,000 miles, that has a fuel economy of at least 30 miles per gallon (MPG). In some embodiments, described in greater detail below, user preference data may include a user's preferences as to which parameter or parameters are of greater relative importance (e.g., which parameters matter more to the user).

User preference data may include one or more parameter values relating to the model of a vehicle. For example, user preference data may include a parameter value that identifies a specific model of vehicle that the user prefers. In some embodiments, user preference data may include a parameter value that identifies a user's preference for vehicles based on size class, such as, for example, compact, mid-size, full, minivan, truck, or sport-utility vehicle (SUV). User preference data may include one or more parameter values relating to the specific design model of a vehicle, such as, for example, Fiat Jeep Cherokee, Chevrolet Malibu, Ford Focus, Nissan Leaf, Hyundai Sonata, Toyota Corolla, BMW 328i, Subaru Outback, Volkswagen Jetta, Jaguar F-type. Further, user preference data may include a parameter value identifying a preferred model year of a vehicle (e.g., a specific iteration of a model, or a parameter related to the year of manufacture of the vehicle). In some embodiments, make of vehicle, model of vehicle, or model year may be combined into a single parameter value. In some embodiments, user preference data may include a parameter value that identifies a class, tier, or group of vehicle manufacturers, such as, for example, economy value manufacturers, mid-tier manufacturers, or luxury or high-end manufacturers. Additionally, or in the alternative, user preference data may include a parameter value that identifies the manufacturer of a vehicle, such as, for example, Fiat, General Motors, Ford, Nissan, Hyundai, Toyota, BMW, Subaru, Volkswagen, Jaguar Land Rover, etc.

User preference data may include one or more parameter values relating to the mileage and/or ownership history of a vehicle. For example, one or more parameter values may relate to the mileage of a vehicle, the percentage of the mileage of the vehicle incurred in urban driving environments, the number of previous owners of a vehicle, and/or the types of previous owners (e.g., individual, family, corporate, commercial, rental, lessee). The parameter values related to mileage of a vehicle may be approximations, such as, for example, mileage to the nearest thousand miles, or mileage to the nearest hundred miles. Mileage may be tolled in terms of miles driven, kilometers driven, gallons of fuel consumed, or other measure of vehicle use. As described above, the parameter values may be ranges, approximations, or other expression indicating a preference. For example, user preference data may include one or more parameter values that convey a user prefers a new vehicle, a vehicle with less than 10,000 miles, a vehicle with about 40,000 miles, or a vehicle with at least 80,000 miles.

User preference data may include one or more parameter values relating to a preferred location of a vehicle. For example, user preference data may include information relating to a zip code in which the vehicle is currently located, the state in which the vehicle is currently located, and/or other denomination of physical location (e.g., city, county, region, country). These parameters values may be combined into a single location-based parameter value or may be included redundantly or semi-redundantly within user preference data.

In addition to location information, user preference data may include one or more parameter values relating to a dealer in possession of a vehicle. In some embodiments, this parameter also may contain information relating to the physical location of the vehicle. These parameters values may include an alphanumeric dealer ID or dealership identifier. In some instances, user preference data may include one or more parameter values that identify a specific lot, dealership, or parking space the vehicle is located. One or more parameter values of user preference data may identify a dealer of a conglomeration of dealers which maintains responsibility and ownership of the vehicle.

User preference data may include one or more parameter values relating to the value of a vehicle. The value of a vehicle may be a number related to absolute monetary worth, one or more listed prices, a value of the vehicle suggested by manufacturer, distributor, or seller, or a subjective value that the given user may associate with a vehicle. Further, user preference data may include one or more parameter values indicative of tiers of vehicles, such as, for example, high-end vehicles, mid-tier vehicles, economy vehicles, new vehicles, gently used vehicles, or extensively used vehicles.

User preference data may include one or more parameter values related to the condition of a vehicle. For example, one or more parameter values of user preference data may contain information including accident history, repair history, current aesthetic or mechanical defects, and/or ownership history of a vehicle.

User preference data may include one or more parameters related to auxiliary features of a vehicle, such as, for example, luxury features, optional add-ons, or safety enhancements. For example, one or more parameter values of user preference data may include information related to the presence of sun roof, moon roof, climate controls, four-wheel drive, power windows, side airbags, backup camera, roof rack, integrated smart car technologies (e.g., lane departure detection, dynamic cruise control, braking assist), adjustable user interface (e.g., adjustable pedals, adjustable seats, adjustable steering wheel, seat memory), anti-lock brakes, anti-theft system, entertainment center, remote start, roof rails, smart device integration, WiFi Hotspot, and/or voice-activated command system in a vehicle.

In some embodiments, there is a domain of vehicles. The domain of vehicles may represent known vehicles available for purchase. In other embodiments, the domain of vehicles may represent all vehicles available for purchase in one legal jurisdiction, all vehicles available for purchase of a certain type, all vehicles available for purchase within a geographic area, all vehicles available for purchase within a certain mileage, all vehicles available for purchase of a common ownership history, collected libraries of vehicles, or unions and/or intersections of the aforementioned domains. In at least one embodiment, the domain of vehicles may represent all vehicles for which values for all parameters of user preference data are known. For example, if user preference data indicates a user prefers vehicles similar to a Toyota Corolla, with about 80,000 miles, that has a fuel economy of at least 30 MPG, then the domain may include all known vehicles for which the model, mileage, and fuel economy are defined.

According to one or more embodiments, for each vehicle in the domain of vehicles, each parameter of that vehicle may be converted to a parameter similarity value. In some embodiments, only the parameters corresponding to the parameter values expressed in the user preference data are converted to parameter similarity values. For example, if the user preference data included information that the user prefers vehicles similar to a Toyota Corolla, with about 80,000 miles, that has a fuel economy of at least 30 MPG, then the model, mileage, and fuel economy parameters of all vehicles in the domain of vehicles would be converted to parameter similarity values.

A parameter similarity value is a number that corresponds to a parameter of a vehicle. In some embodiments, parameter similarity values may be numerically related to their corresponding parameter (e.g., a rounded or truncated factor of the parameter). For example, mileages such as 15,750 miles and 123,456 miles may, respectively, be converted to parameter similarity values such as, by way of non-limiting example, 15,750 and 123,456; 15.8 and 123.5; 1.6 and 12.3; or 20 and 120. In some embodiments, parameter similarity values may be scaled and/or relative values greater than or equal to zero and less than or equal to one. Using the example parameter of mileage described above, a relatively low mileage such as 15,750 may be converted to a parameter similarity value of 0.105 and a relatively high mileage, such as 123,456 may be converted to a parameter similarity value of 0.823 (based on an example theoretical maximum mileage of 150,000). For example, in embodiments where user preference data indicates a preference for a specific mileage, e.g., 80,000 miles, parameter similarity values may be calculated based their similarity to the desired parameter (for example, a mileage of 75,000 may be converted to a parameter similarity value of 0.95 and a mileage of 120,000 may be converted to a parameter similarity value of 0.20). In embodiments where a user preference data indicates a preferences for above or below a parameter value (e.g., above or below a certain mileage), the parameter similarity values may be adjusted accordingly. For example, if user preference data includes parameters indicating a user wants vehicles with less than 80,000 miles, a vehicle with 82,000 miles may have the same parameter similarity value as a vehicle with 70,000 miles, reflecting the user's preference that a vehicle with less than 80,000 miles is more desirable than a vehicle with greater than 80,000 miles. In some embodiments, a user may desire a vehicle with "low" mileage, "high" mileage, or other generalized relative range. These preferences can be used to determine corresponding parameter similarity values. The above-described methods of converting parameters to parameter similarity values may be used to convert any numerical parameters (e.g., fuel economy, value, distance from user) to parameter similarity values.

Other parameters, including those which can be expressed in a binary state, such as whether a vehicle is new or used, includes a particular luxury feature and/or safety enhancement (e.g., sun roof), has a history of collision(s), or is in the possession particular dealer may be converted to a zero or a one (e.g., all used cars have a parameter similarity value of zero and all new cars have a parameter similarity value of one).

Figure 2:
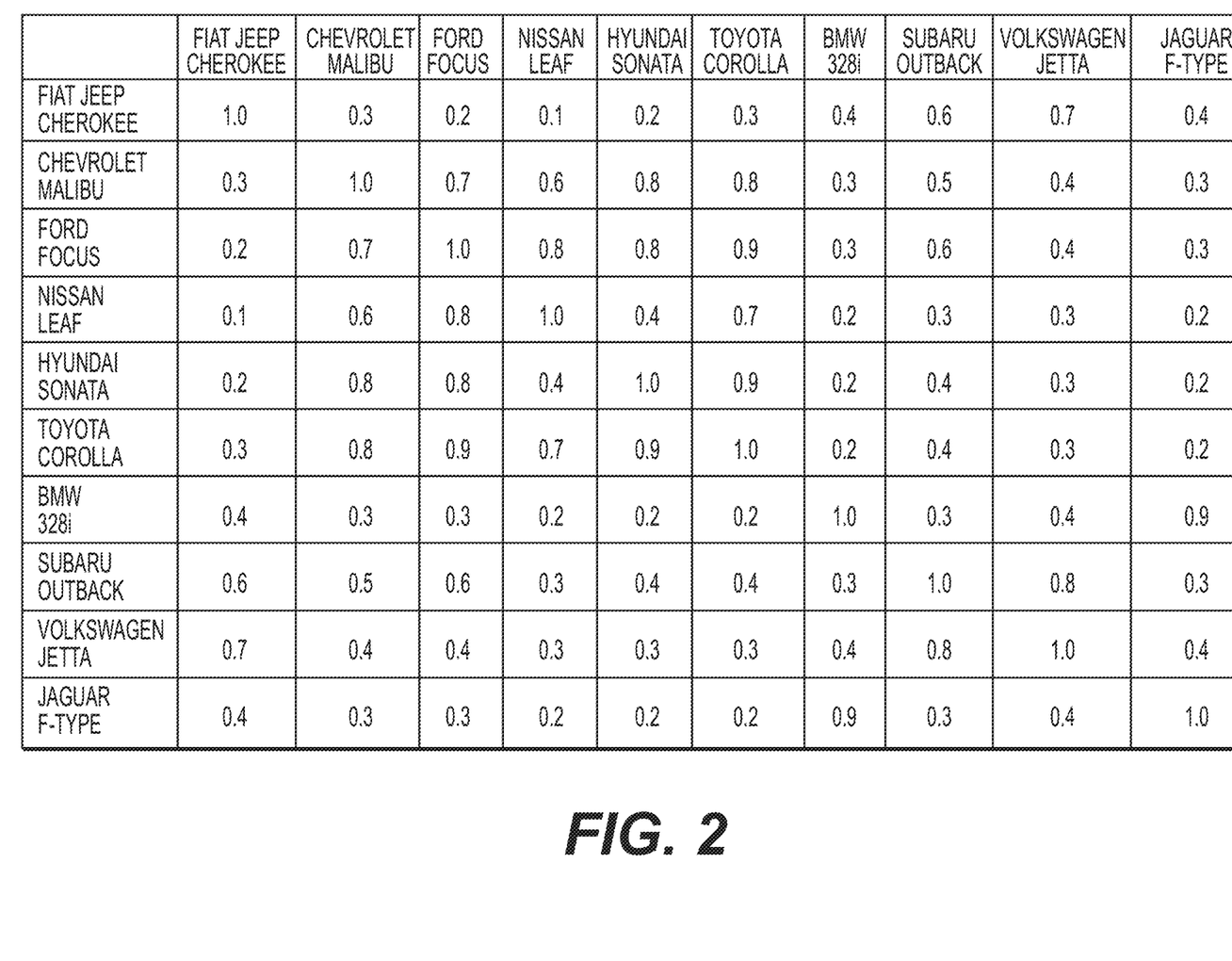
FIG. 2 depicts an example similarity matrix, according to one or more embodiments.

Some parameters, including non-numerical and non-binary parameters, such as vehicle model, vehicle color, or geographic location, may be converted to parameter similarity values via a similarity matrix, lookup table, or other reference medium. One such example similarity matrix is shown in FIG. 2. Each parameter value for a particular parameter is plotted against other possible parameter values of the particular parameter. Each intersection of a row and a column of the similarity matrix indicates a parameter similarity value that corresponds to the similarity between the two parameter values. In the example shown in FIG. 2, if user preference data indicates a user prefers a Toyota Corolla, vehicles in the domain may be assigned parameter similarity values based on the model (e.g., a Hyundai Sonata would be assigned a 0.9 and a BMW 328i would be assigned a 0.2, indicating a Sonata is more like a Corolla than a 328i). The similarity matrix shown in FIG. 2 is one example. Other similarity matrices may be used to determine parameter similarity values for any parameter, having any number of possible parameter values, of a vehicle.

According to one or more embodiments, in addition to containing one or more parameter values, user preference data may also include parameter weights. Parameter weights indicate which parameters have greater import to the user. In other words, parameter weights indicate which parameters of a vehicle the user cares more about. While parameter weights may be included in user preference data, parameter weights may also be determined based on the preferences of a population, based on a user's activities or history (e.g., purchase history, search history, vehicle ownership history), or determined from a machine-learning model, regression model, or other statistical model. In some embodiments, parameter weights are positive real numbers. In other embodiments, parameter weights may be negative to reflect the nature of a parameter. For example, in situations where more mileage on a vehicle is less desirable (indicated by the user preference data and/or parameter weights) the parameter weight for mileage may be negative to accurately reflect the impact of mileage on the desirability of the vehicle. It should be noted, that parameter weights do not have to be negative in such situations, as an alternative, the parameter similarity values may be calculated in such a manner to give greater parameter similarity values to vehicles more desirable to the user. In some embodiments, parameter weights are greater than or equal to zero and less than or equal to one.

In embodiments where parameters weights are included in user preference data, there are multiple ways a user may assign parameter weights to parameters. For example, a user may rank parameters in their order of import, assign a weight to each parameter, assign a weight to one or more parameters, or indicate on a continuum or sliding scale of importance where each parameter falls. A user may assign numerical values to each parameter indicative of their importance to the user, these values may be used as parameter weights or converted to parameter weights.

In some arrangements, a user may assign a numerical value to each parameter in response to one or more prompts or questions. For example, one or more questions may be delivered to a user device (e.g., computer, mobile device, etc.) associated with the user via browser, application, or other user input interface. Each question may prompt the user to input one or more parameter values, parameter weights, or other aspect of user preference data. In response, the user may respond to the one or more questions for example, by selecting one or more of a variety of options (e.g., via drop-down list, radio buttons, toggle switches, or similar user input interface), responding via a natural language text string, or inputting numerical information. The user's responses may include, inform, or help determine parameter values, parameter weights, and/or other aspects of user preference data.

Figure 3A:
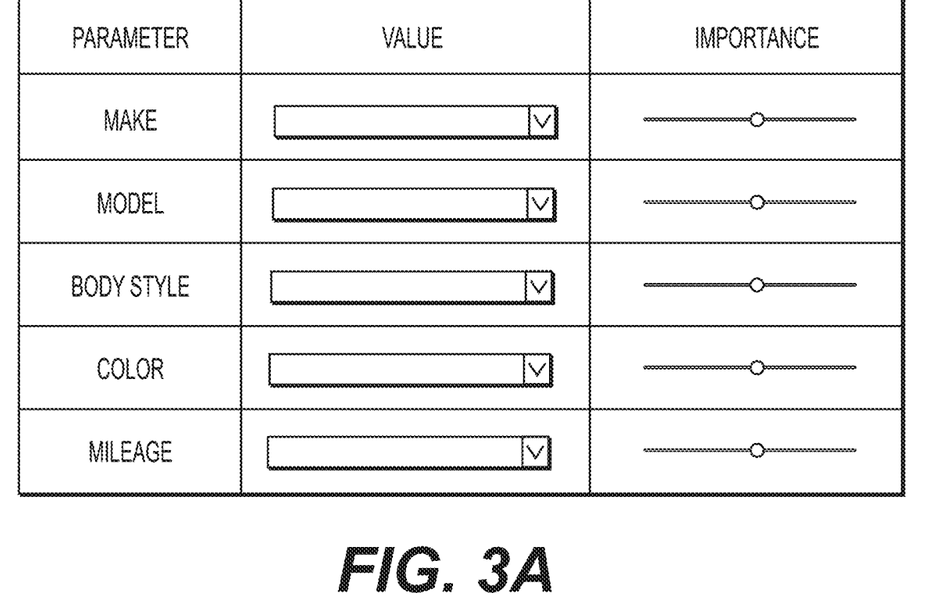
FIG. 3A depicts an example user input interface, according to one or more embodiments.
Figure 3B:
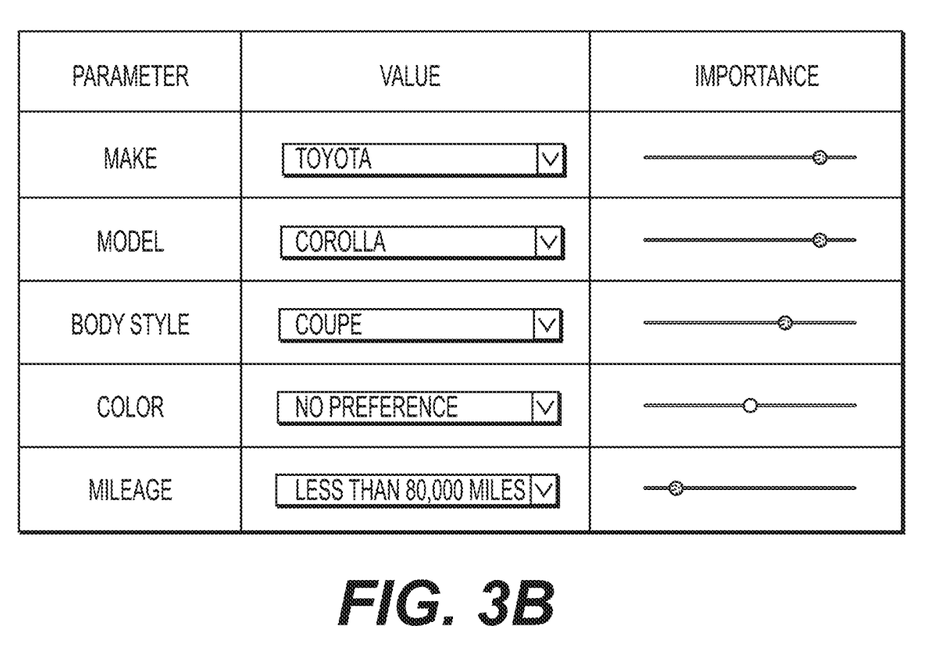
FIG. 3B depicts the example user input interface of FIG. 3A, including example user selections.

One such example user input interface is shown in FIGS. 3A-3B. FIG. 3A depicts an example user input interface prior to a user entering information (e.g., inputting user preference data). Conversely, FIG. 3B depicts a potential collection of input information (e.g., an example user input interface with example user preference data). As can be seen in FIGS. 3A-3B, potential values of a plurality of parameters may be selected from one or more drop-down lists. Additionally, for each parameter, a user may be able to slide a marker along a continuum to indicate a level of importance for the corresponding parameter. The user inputs related to level of importance may be converted to parameter weights. Further, as shown in FIG. 3B the user may have the option to indicate if they have no particular preference in regards to one or more parameters.

Figure 4A:
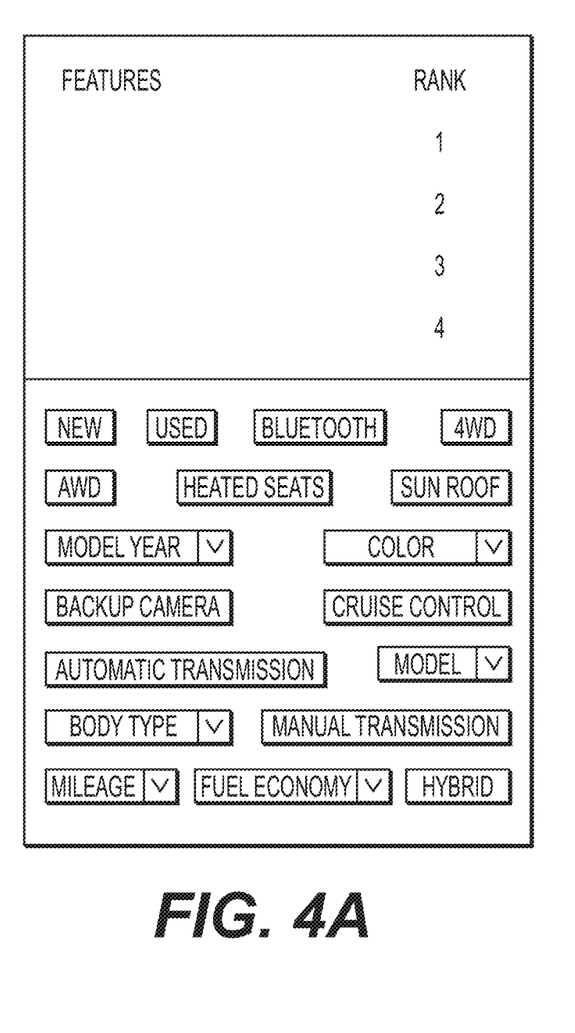
FIG. 4A depicts an example user input interface, according to one or more embodiments.
Figure 4B:
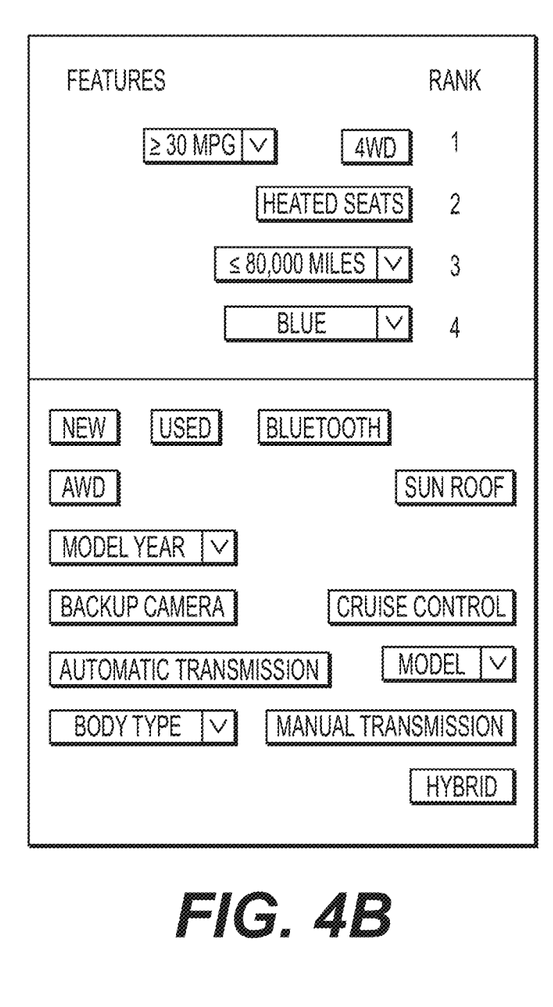
FIG. 4B depicts the example user input interface of FIG. 4A, including example user selections.

Another example user input interface is shown in FIGS. 4A-4B. Similar to the example user input interfaces described above, FIG. 4A depicts an example user input interface prior to a user entering information (e.g., inputting user preference data), while FIG. 4B depicts a potential collection of input information (e.g., an example user input interface with example user preference data). As can be seen in FIGS. 4A-4B, a user may select one or more parameters or parameter value boxes from a pool of available options. The user may then rank those parameters or parameter values in order of importance. For some parameters, such as, for example, color, a user may select a parameter value from a drop down list. Based on the input parameters and the ranking of the parameters, parameter weights may be determined.

After vehicles of a domain have their respective parameters converted to parameter similarity values and parameter weights are received, a sort score (z) for each vehicle may be determined. A sort score (z) may be determined from the parameter similarity values (x) and received parameter weights ($\omega$) in a manner that allows vehicles more similar to a user's preferences, as indicated in user preference data, to have a relatively higher sort score (z). In other embodiments, sort score (z) may be determined from the parameter similarity values (x) and received parameter weights ($\omega$) in a manner that allows vehicles more similar to a user's preferences, as indicated in user preference data, to have a relatively lower sort score (z). Therefore, after a sort score (z) for each vehicle in the domain has been determined, the vehicles may be sorted in either an ascending or descending order on the basis of the sort score (z). This sorted list may be representative of a curated list of vehicles in an order of importance or relevance to the user.

According to one or more embodiments, sort score (z) may be calculated according to Equation 1 for an n number of parameters.

$$z = \frac{\sum_{i=1}^{n} \omega_i}{\sum_{i=1}^{n} \frac{\omega_i}{x_i}} \qquad \text{Eq. (1)}$$

In some embodiments, sort score (z) may be calculated according to Equation 2 for an n number of parameters.

$$z = \frac{\sum_{i=1}^{n} \omega_i x_i}{\sum_{i=1}^{n} \omega_i} \qquad \text{Eq. (2)}$$

In embodiments where only two parameters are being analyzed and compared, Equation 3 may be used to calculate a sort score (z) based on a parameter weight ($\omega$) and the two parameter similarity values ($x_1$, $x_2$).

$$z = \frac{(1 + \omega^2) x_1 x_2}{\omega^2 x_1 + x_2} \qquad \text{Eq. (3)}$$

Any of the means described above for calculating a sort score (z) may be used in isolation or in combination with any other described means for calculating a sort score (z). For example, multiple sort scores (z) may be calculated and averaged together for each vehicle. As a non-limiting, illustrative example, a domain may include three vehicles having the models, mileage, and fuel economy shown in Table 1.

TABLE 1

| Example Domain of Vehicles and Associated Parameter Values | | | |
|---|---|---|---|
| Parameter | Model | Mileage | Fuel Economy |
| Vehicle 1 | Chevrolet Malibu | 97,888 | 29 MPG |
| Vehicle 2 | Ford Focus | 24,512 | 34 MPG |
| Vehicle 3 | Subaru Outback | 65,780 | 25 MPG |

Given user preference data that a user prefers vehicles similar to a Toyota Corolla, with about 80,000 miles, that has a fuel economy of at least 30 MPG, the parameters of each of the three vehicles shown in Table 1 may be converted to the parameter similarity values ($x_i$) shown in Table 2 based on the previously described methods of determining parameter similarity values.

TABLE 2

| Example Domain of Vehicles and Associated Parameter Similarity Values | | | |
|---|---|---|---|
| Parameter | Model ($x_1$) | Mileage ($x_2$) | Fuel Economy ($x_3$) |
| Vehicle 1 | 0.8 | 0.78 | 0.4 |
| Vehicle 2 | 0.9 | 0.31 | 0.8 |
| Vehicle 3 | 0.4 | 0.82 | 0.2 |

The exemplary user preference data described above may also include parameter weights ($\omega_i$), such as, for example, a weight indicative that the user cares most about the model of vehicle being similar to a Toyota Corolla, cares secondarily that the vehicle has about 80,000 miles, and cares the least about the fuel economy of the vehicle. Based on these preferences, parameter weights ($\omega_i$) may be assigned to the model, mileage, and fuel economy parameters (e.g., $\omega_1$=0.8, $\omega_2$=0.4, $\omega_3$=0.1). Based on the parameter weights ($\omega_i$) and the parameter similarity values ($x_i$) shown in Table 2, sort scores (z) may be determined according to Equations 1 and 2, as shown in Table 3.

TABLE 3

| Example Domain of Vehicles and Associated Sort Scores (z) | | |
|---|---|---|
| | Sort Score (z) as calculated by Eq. 1 | Sort Score (z) as calculated by Eq. 2 |
| Vehicle 1 | 0.737 | 0.800 |
| Vehicle 2 | 0.564 | 0.677 |
| Vehicle 3 | 0.435 | 0.246 |

In a simplified example where a user does not care about the fuel economy of a vehicle, Equation 3 may be used to determine a sort score (z). As described previously, Equation 3 may be applied in cases where only two parameters of the domain of vehicles are compared. Reflecting the exemplary user preference data referred to above, when the user cares more about model ($x_1$) than mileage ($x_2$) an example parameter weight ($\omega$) may be, for example, 0.7. Based on the parameter weight ($\omega$) and the parameter similarity values ($x_1$ and $x_2$) shown in Table 2, sort scores (z) may be determined according to Equations 1 and 2, as shown in Table 3.

TABLE 4

Example Domain of Vehicles and Associated Sort Scores (z)

| | Sort Score (z) as calculated by Eq. 3 |
|---|---|
| Vehicle 1 | 0.793 |
| Vehicle 2 | 0.554 |
| Vehicle 3 | 0.481 |

As can be seen in Tables 3 and 4, different equations can produce different sort scores (z). This is due to differences in how parameter weights ($\omega_i$) are combined with parameter similarity values ($x_i$), to arrive at weighted preferences. However, any method or combination of methods described herein of determining a sort score (z) from parameter weights ($\omega_i$) and similarity values ($x_i$) may be implemented. Each method of calculating sort score (z) described herein considers the similarity of each vehicle of the domain to the preferences in the user preference information and the amount user cares about each parameter of the candidate vehicles.

In further embodiments, a domain of vehicles may be culled into a set of vehicles, reducing the number of vehicles for which parameters must be converted to parameter similarity values and the number of sort scores which must be calculated. For example, in some embodiments, user preference data may indicate a user only wants to view vehicles within a threshold geographic distance from the user. In other embodiments, a user may only wish to view new vehicles and/or vehicles that have not been involved in an accident. This information in the user preference data may be converted to a "hard filter" that filters (e.g., removes) vehicles not aligned with the user's preferences from the domain of vehicles. The remaining vehicles of the domain not removed by the hard filter may be referred to as a set of vehicles. The methods and systems disclosed herein for assigning parameter similarity values and sort scores for each vehicle in a domain may be applied to the vehicles of a set.

In some embodiments, a list of vehicles and their associated sort scores may be culled after sort scores are determined. For example, vehicles with a sort score above or below a threshold z-value may be culled from the set of vehicles for which sort scores have been calculated. The threshold z-value may be a part of user preference data, determined from user preference data, determined from population preferences, based on a user's activities or history (e.g., purchase history, search history, vehicle ownership history), or determined from a machine-learning model, regression model, or other statistical model. The culled list of vehicles and their associated sort scores may be representative of a subset of the vehicles of the domain (e.g., vehicles of the set) which are most relevant to the user associated with the user preference data.

Figure 5:
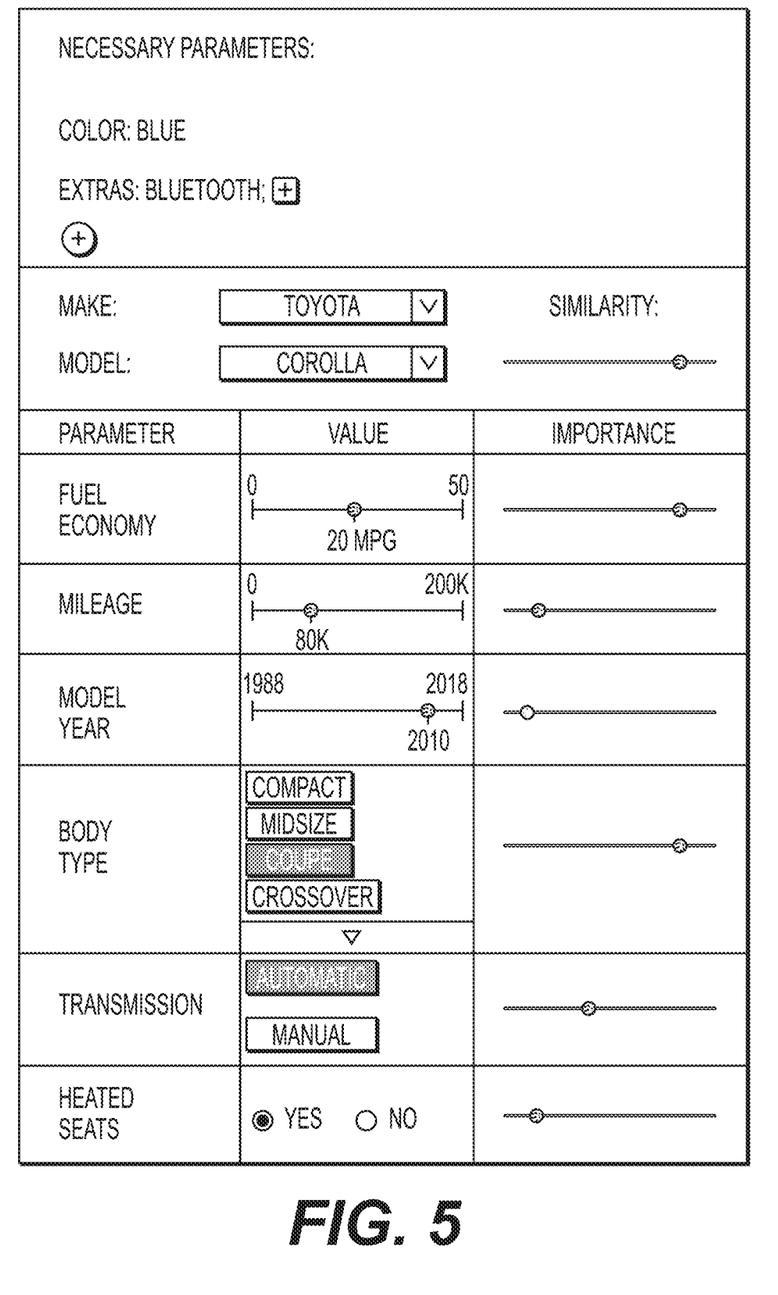
FIG. 5 depicts an example user input interface, according to one or more embodiments, including example user selections.

Referring to FIG. 5, in one or more embodiments, a user input interface may allow for a user to input user preference data related to one or more "hard filters," such as, for example, the "Necessary Parameters" section and/or the make and model similarity section shown in FIG. 5. In one or more embodiments, a user input interface may allow a user to select one or more "hard filters," as described above, to cull, organize, sort, or collect purchase information. For example, a user may input that the car needs to be blue, or must have Bluetooth compatibility. Correspondingly, one or more hard filters may be applied to remove all vehicles from the domain that are not blue or do not have Bluetooth compatibility. Similarly, a user may input how much similarity to a particular make and model is desired, or alternatively, how much variation from a particular make and model would be allowable. As a result, one or more hard filters may be applied to remove all vehicles from the domain which deviate from an allowable about of similarity to the desired make and model. Other user preference data, e.g., other user preference data entered into a user input interface, may then be used to assign parameter similarity values to the remaining vehicles in the culled list. The components, aspects, methods, systems, and sub-systems, of any example user input interface (e.g., those described in relation to FIGS. 3A-5) may be used with one or more other components aspects, methods, systems, or sub-systems of any example user input interface, including, by way of non-limiting example, necessary parameter input regions, make and model similarity tolerance regions, parameter drop-down lists, parameter drag-and-drop boxes, parameter value drop-down lists, parameter value drag-and-drop boxes, ranking positions, sliders, importance slides, weight sliders, parameter value sliders, toggle boxes, toggle lists, radio buttons, or other user input interface features.

As described above, a list of vehicles and their associated sort scores may be organized in ascending or descending order, based on the sort score. This list may be representative of the vehicles of the domain which are most relevant to the user associated with the user preference data in order of relevance.

Figure 1:
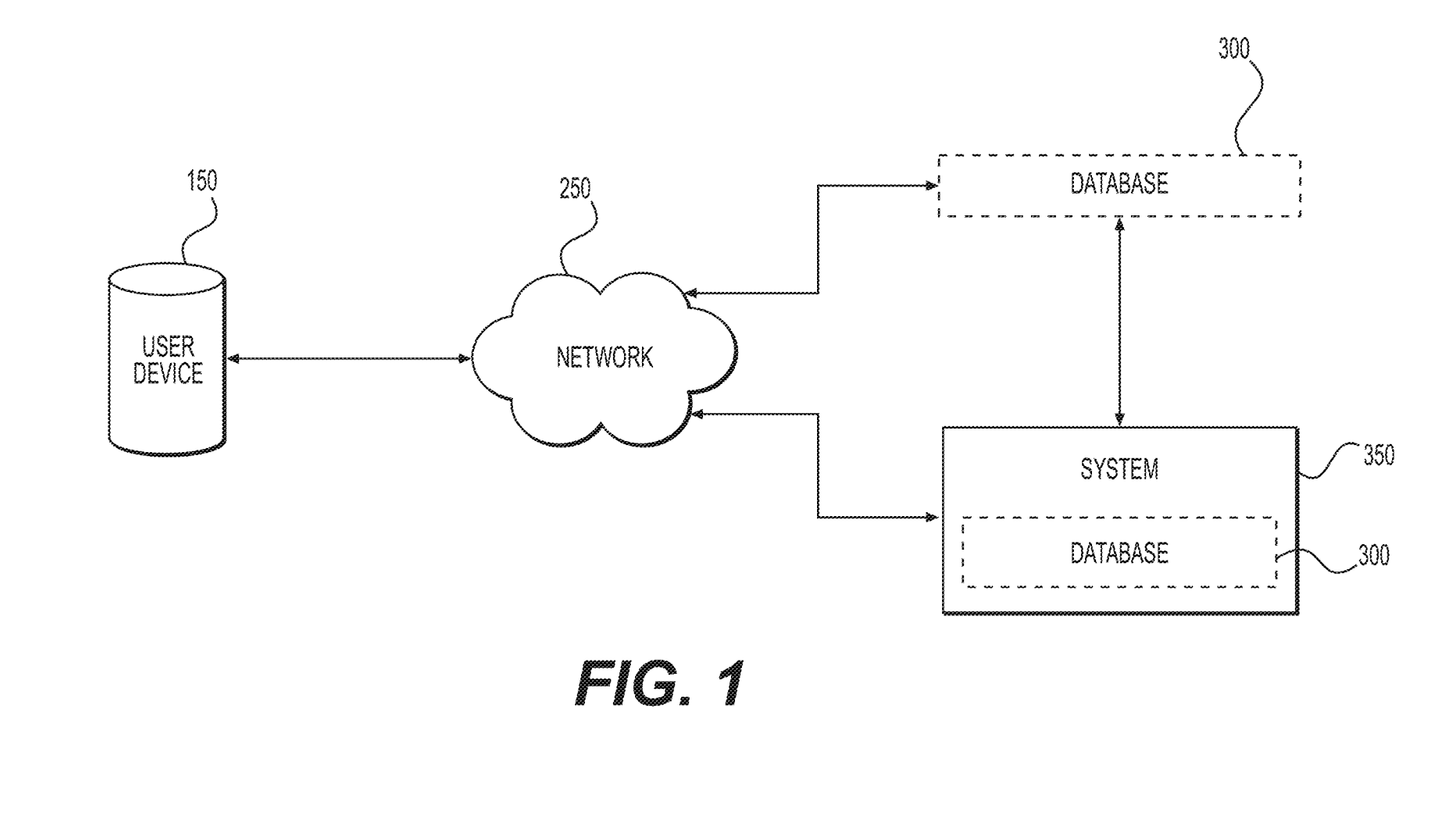
FIG. 1 depicts an example environment in which methods, systems, and other aspects of the present disclosure may be implemented.

Referring to the exemplary environment shown in FIG. 1, user preference data may be transmitted from a user device 150, via a network 250 (e.g., a private or public network), and received by a system 350. A database 300 may be configured as part of system 350, or the database 300 may be in communication with system 350 via network 250 or a local connection. The database 300 (or a plurality of databases 300) may include information on the vehicles of the domain of vehicles (e.g., parameter values for each vehicle). System 350 and/or user device 150 may determine parameter similarity values, parameter weights, sort scores, threshold z-scores, and/or a list of relevant vehicles. Similarly, system 350, user device 150, or both may order the list of relevant vehicles on the basis of their associated sort scores.

In some embodiments, system 350 may transmit information regarding one or more vehicles of the list of vehicles (e.g., parameter similarity values, sort scores) via text display, photographic display, hyperlink, video/audio displays, SMS, messaging application or service, email, or any other suitable mechanism to a user, dealer, or other party. In this context, other parties may refer to others involved in the distribution of vehicles or users with similar preferences to the user corresponding to the antecedent user preference data.

Figure 6:
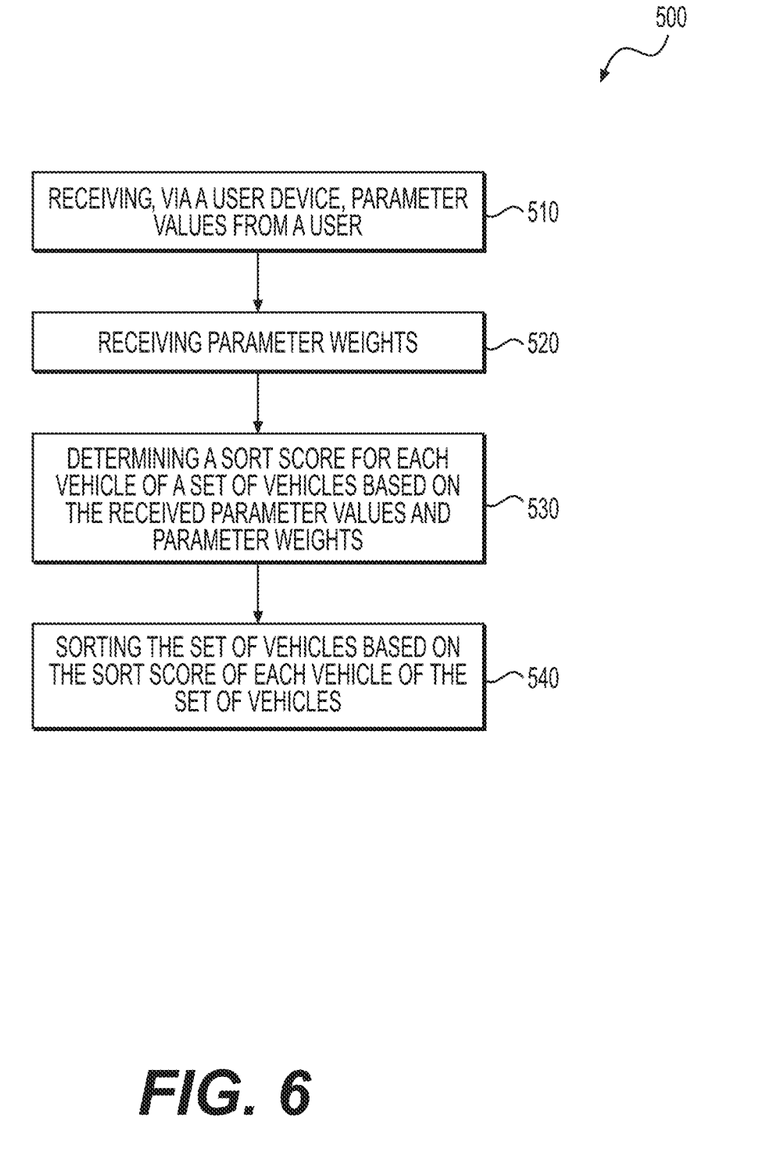
FIGS. 6-7 are flow charts showing exemplary methods for providing personalized purchase recommendations, according to one or more embodiments.

A flowchart of an exemplary method 500 for determining a set of purchase recommendations is shown in FIG. 6. The method 500 may include receiving, via a user device, parameter values from a user (step 510). In some embodiments, method 500 may further include receiving parameter weights (step 520). In some aspects, the parameter weights may be received via a user device (e.g., user device 150). Further, method 500 may include determining a sort score for each vehicle of a set of vehicles based on the received parameter values and parameter weights (step 530). The sort score may be determined according to one or more of Equation 1, Equation 2, or Equation 3. In some embodiments, the set of vehicles may be a domain of vehicles. Additionally, method 500 may include sorting the set of vehicles based on the sort score of each vehicle of the set of vehicles (step 540).

Figure 7:
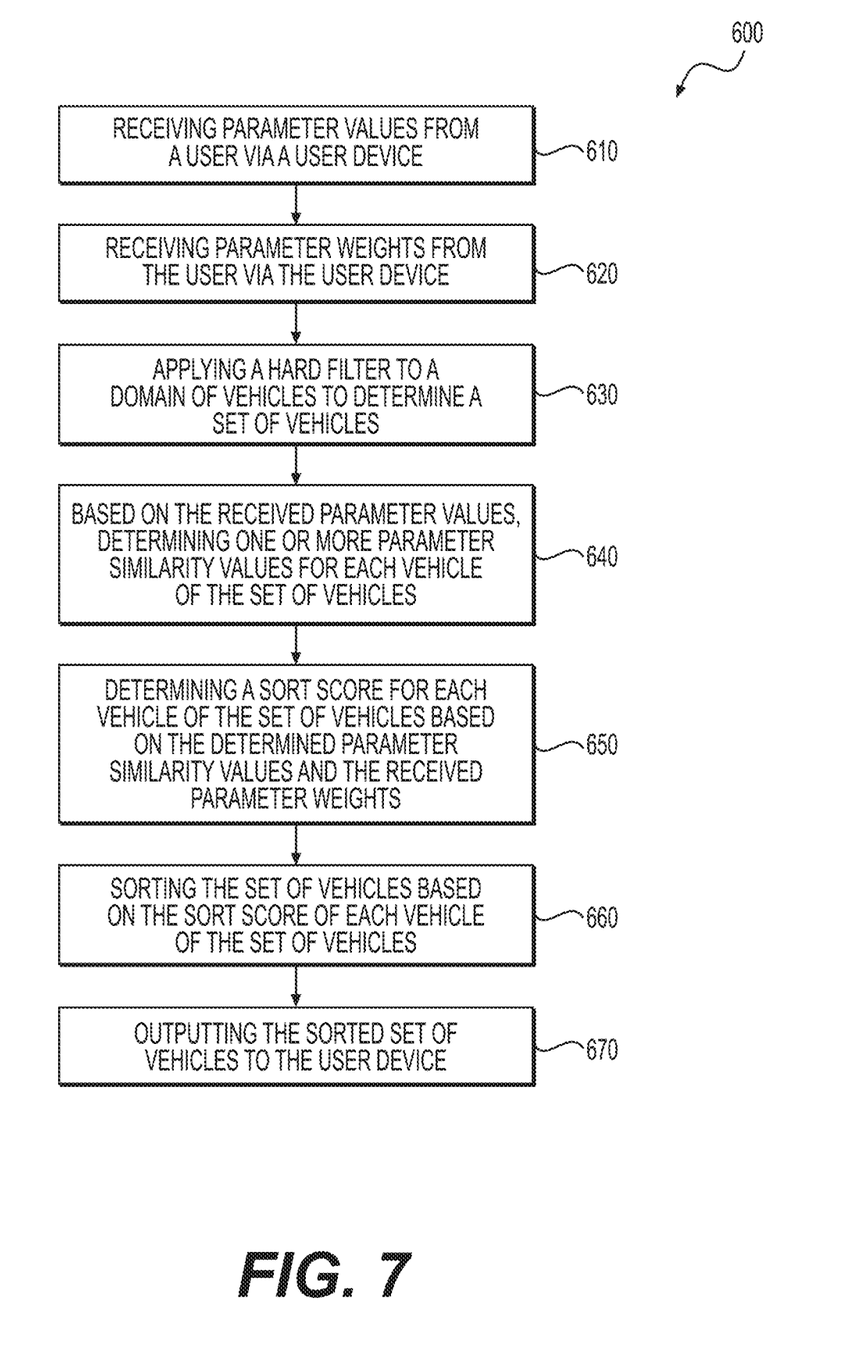
Figure 8:
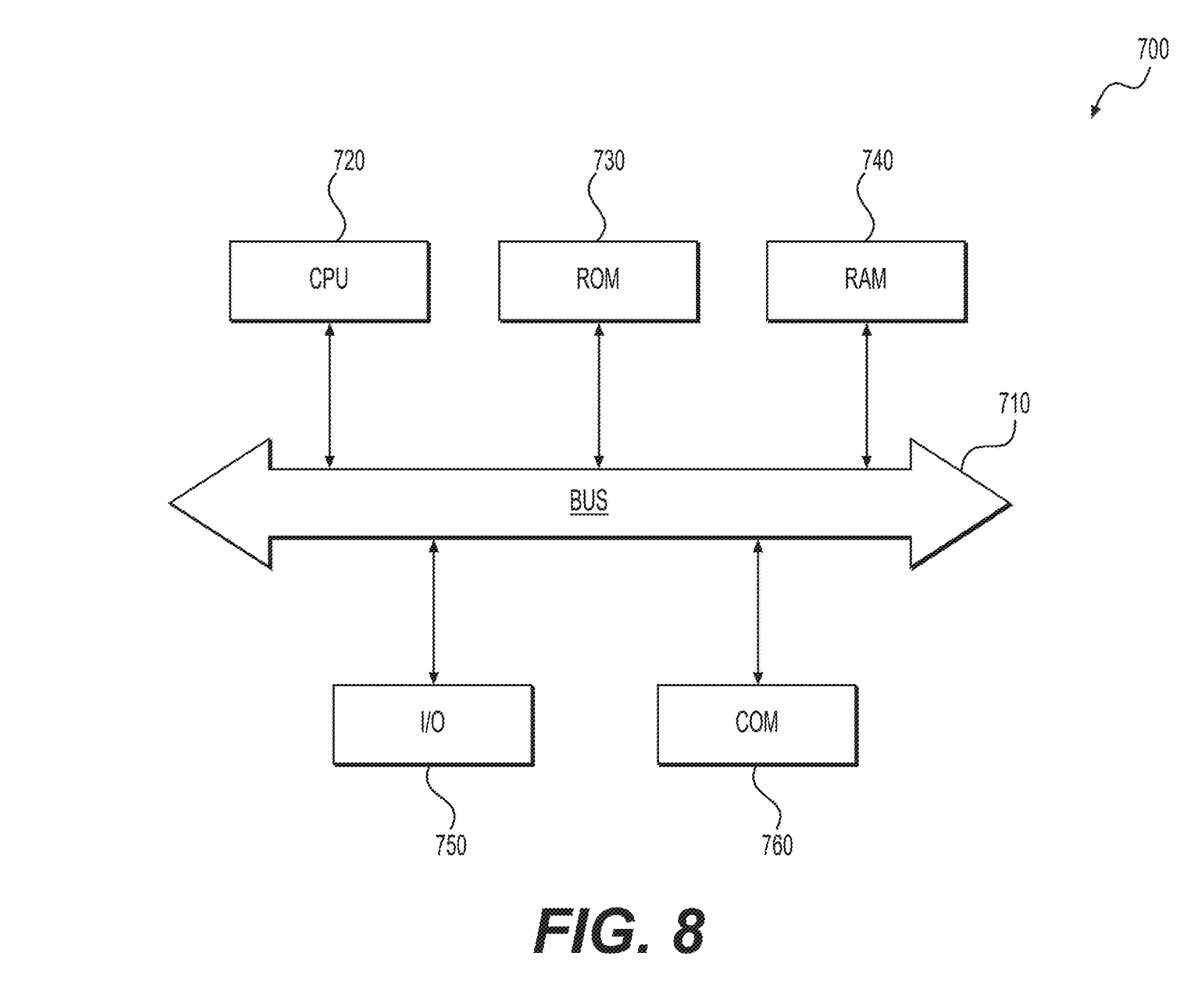
FIG. 8 depicts an example system that may execute techniques presented herein.

A flowchart of an exemplary method 600 for populating a list of vehicles is shown in FIG. 7. The method 600 may include receiving parameter values from a user via a user device (step 610). Method 600 may further include receiving parameter weights from the user via the user device (step 620). In some embodiments, method 600 includes applying a hard filter to a domain of vehicles to determine a set of vehicles (step 630). In certain aspects, method 600 may include determining one or more parameter similarity values for each vehicle of the set of vehicles, based on the received parameter values (step 640). Method 600 may further include determining a sort score for each vehicle of the set of vehicles based on the determined parameter similarity values and the received parameter weights (step 650). The sort score may be determined according to one or more of Equation 1, Equation 2, or Equation 3. In some embodiments, method 600 may further include sorting the set of vehicles based on the sort score of each vehicle of the set of vehicles (step 660). Further, method 600 may include outputting the sorted set of vehicles to the user device (step 670). Outputting may include, but is not limited to, transmitting information regarding one or more vehicles of the sorted set of vehicles via text display, photographic display, hyperlink, video/audio displays, SMS, messaging application or service, email, or any other suitable mechanism to a user, dealer, or other party FIG. 8 is a simplified functional block diagram of a computer/hardware 700 that may be configured as a device for executing the methods of FIGS. 6-7, according to exemplary embodiments of the present disclosure. FIG. 8 is a simplified functional block diagram of a computer that may be configured as the user device 150 and/or system 350 for executing the methods presented herein, according to exemplary embodiments of the present disclosure. Specifically, in one embodiment, any of the user devices and systems discussed herein may be an assembly of hardware 700 including, for example, a data communication interface 760 for packet data communication. The platform also may include a central processing unit ("CPU") 720, in the form of one or more processors, for executing program instructions. The platform may include an internal communication bus 710, program storage, and data storage for various data files to be processed and/or communicated by the platform, such as read-only memory (ROM) 730 and random access memory (RAM) 740, although the system 700 may receive programming and data via network communications. The system 700 also may include input and output ports 750 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

As noted above, this disclosure is not limited to the context of vehicles. The above described methods and systems may be implemented to provide any set of items from a domain of items based on input criteria. This may be used to provide recommendations for other items, such as, for example, home theaters, mattresses, boats, computers, or real estate.

In general, any process discussed in this disclosure that is understood to be performable by a computer may be performed by one or more processors. Such processes include, but are not limited to: the processes shown in FIGS. 6 and 7; and processes involving operations of the database 300, system 350, and user device 150. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A system for determining purchase recommendations, comprising:
    at least one processor; and
    a memory operatively connected to the at least one processor and including instructions that are executable by the at least one processor to perform acts, including:
        causing a user device to output a user input interface that enables a user to manipulate graphical objects to set parameter values and parameter weights for a plurality of parameters of an item;
        determining, based on manipulation of the graphical objects by the user via the user input interface, parameter values and parameter weights for the plurality of parameters of the item;
        generating one or more parameter similarity values for each item of a set of items based on the parameter values;
        determining a sort score for each item of the set of items based on the parameter weights and the generated parameter similarity values; and
        sorting the set of items based on the sort score of each item of the set of items.

2. The system of claim 1, wherein the acts further include applying a hard filter to a domain of items to determine the set of items.

3. The system of claim 1, wherein the acts further include:
    determining a subset of items from the set of items based on the sort score of each item;
    sorting the items of the subset of items based on the sort score of each item; and
    outputting the sorted subset of items to the user device.

4. The system of claim 1, wherein the acts further include outputting the sorted set of items to the user device.

5. The system of claim 1, wherein each parameter similarity value is greater than or equal to 0 and less than or equal to 1.

6. The system of claim 1, wherein the one or more parameter similarity values are based on a similarity matrix.

7. The system of claim 1, wherein:
    the sort score for each item of the set of items is determined according to at least one of:

$$z = \frac{\sum_{i=1}^{n} \omega_i}{\sum_{i=1}^{n} \frac{\omega_i}{x_i}};$$

$$z = \frac{\sum_{i=1}^{n} \omega_i x_i}{\sum_{i=1}^{n} \omega_i}; \text{ or}$$

$$z = \frac{(1 + \omega^2) x_1 x_2}{\omega^2 x_1 + x_2}; \text{ and}$$

the sort score (z) is calculated based on parameter similarity values ($x_i$) and parameter weights ($\omega_i$) for n parameters.

8. The system of claim 1, wherein each of the parameter values is indicative of a respective aspect of the item.

9. The system of claim 1, wherein the parameter weights are indicative of a ranked order of importance of the one or more parameters to the user.

10. The system of claim 1, wherein the parameter weights are associated with less than an entirety of the parameter values.

11. The system of claim 1, wherein each parameter weight is indicative of a level of importance of an associated parameter value to the user.

12. The system of claim 1, wherein the acts further include outputting at least one prompt, via the user device, to the user for input of one or more of a parameter value or a parameter weight associated with the parameter value.

13. A system for determining purchase recommendations, comprising:
    at least one processor; and
    a memory operatively connected to the at least one processor and including instructions that are executable by the at least one processor to perform acts, including:
        causing a user device to output a user input interface that enables a user to manipulate graphical objects to set parameter values and parameter weights for a plurality of parameters of an item;
        determining, based on manipulation of the graphical objects by the user via the user input interface, a plurality of parameter values for the plurality of parameters of the item and at least one parameter weight associated with a respective one of the plurality of parameter values;
        determining a respective parameter similarity value for each item in a set of items based on a comparison of the plurality of parameter values and corresponding features of each item;
        determining a sort score for each item of the set of items based on the at least one parameter weight and the determined parameter similarity values; and
        sorting the set of items based on the sort score of each item of the set of items.

14. The system of claim 13, wherein the acts further include, prior to the sorting of the set of items, applying at least one hard filter to the set of items so as to remove at least one item from the set of items.

15. The system of claim 13, wherein the acts further include outputting the sorted set of items to the user device.

16. The system of claim 13, wherein the determination of the respective parameter similarity value is further based on a similarity matrix of the features of each item.

17. The system of claim 13, wherein:
the sort score for each item of the set of items is determined according to at least one of:

$$z = \frac{\sum_{i=1}^{n} \omega_i}{\sum_{i=1}^{n} \frac{\omega_i}{x_i}};$$

$$z = \frac{\sum_{i=1}^{n} \omega_i x_i}{\sum_{i=1}^{n} \omega_i}; \text{ or}$$

$$z = \frac{(1 + \omega^2) x_1 x_2}{\omega^2 x_1 + x_2}; \text{ and}$$

the sort score (z) is calculated based on parameter similarity values ($x_i$) and parameter weights ($\omega_i$) for n parameters.

18. The system of claim 13, wherein each of the parameter values is indicative of a respective aspect of the item.

19. The system of claim 13, wherein the at least one parameter weight are indicative of one or more of:
a ranked order of importance of the one or more parameters to the user; or
a level of importance of an associated parameter value to the user.

20. A system for determining purchase recommendations, comprising:
at least one processor; and
a memory operatively connected to the at least one processor and including instructions that are executable by the at least one processor to perform acts, including:
causing a user device to output a user input interface that enables a user to manipulate graphical objects to set parameter values and parameter weights for a plurality of parameters of an item;
causing the user input interface to output at least one prompt to the user for input of one or more of parameter values or a parameter weight associated with one or more of the parameter values;
determining, based on manipulation of the graphical objects by the user via the user input interface, parameter values for the plurality of parameters and one or more parameter weights associated with one or more of the parameter values;
generating one or more parameter similarity values for each item of a set of items based on the parameter values;
determining a sort score for each item of the set of items based on the one or more parameter weights and the generated parameter similarity values;
sorting the set of items based on the sort score of each item of the set of items; and
outputting the sorted set of items to the user device.

* * * * *